(12) United States Patent
Fraser

(10) Patent No.: US 6,705,351 B2
(45) Date of Patent: Mar. 16, 2004

(54) FLEXIBLE PIPE AND METHOD OF FABRICATING SAME USING OVERLAPPING LAYERS

(75) Inventor: Dana J. Fraser, Panama City, FL (US)

(73) Assignee: Wellstream International Limited (GB)

( * ) Notice: Subject to any disclaimer, the term of this patent is extended or adjusted under 35 U.S.C. 154(b) by 50 days.

(21) Appl. No.: 10/107,665

(22) Filed: Mar. 26, 2002

(65) Prior Publication Data

US 2003/0183293 A1 Oct. 2, 2003

(51) Int. Cl.[7] ................................................ F16L 11/00
(52) U.S. Cl. ....................... 138/129; 138/130; 138/144; 138/154
(58) Field of Search ................................. 138/129, 130, 138/144, 154, 134, 135

(56) References Cited

U.S. PATENT DOCUMENTS

| | | | | | |
|---|---|---|---|---|---|
| 1,900,792 | A | * | 3/1933 | Brodhun | 138/130 |
| 3,506,040 | A | * | 4/1970 | Everling et al. | 138/130 |
| 4,019,539 | A | * | 4/1977 | Hoffmann et al. | 138/118 |
| 4,106,968 | A | * | 8/1978 | Kutnyak et al. | 156/189 |
| 4,136,715 | A | * | 1/1979 | McCormack et al. | 138/130 |
| 4,266,579 | A | * | 5/1981 | Deiss | 138/127 |
| 4,282,398 | A | * | 8/1981 | Solomon | 174/106 R |
| 5,205,340 | A | * | 4/1993 | Brown et al. | 138/129 X |
| 5,261,462 | A | * | 11/1993 | Wolfe et al. | 138/129 |
| 5,813,439 | A | * | 9/1998 | Herrero et al. | 138/134 |
| 6,382,258 | B1 | * | 5/2002 | Tanaka | 138/130 |
| 6,474,366 | B2 | * | 11/2002 | Bruno | 138/134 |

* cited by examiner

Primary Examiner—Patrick Brinson
(74) Attorney, Agent, or Firm—Haynes and Boone, LLP

(57) ABSTRACT

A flexible method that includes a tubular member defining a longitudinal passage adapted to contain a conveyed fluid, and a plurality of layers of flexible material helically wrapped around the tubular member.

26 Claims, 3 Drawing Sheets

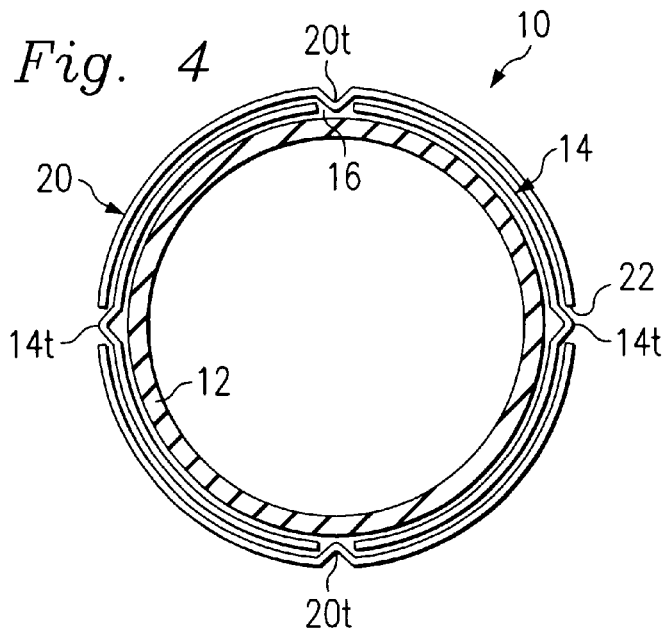
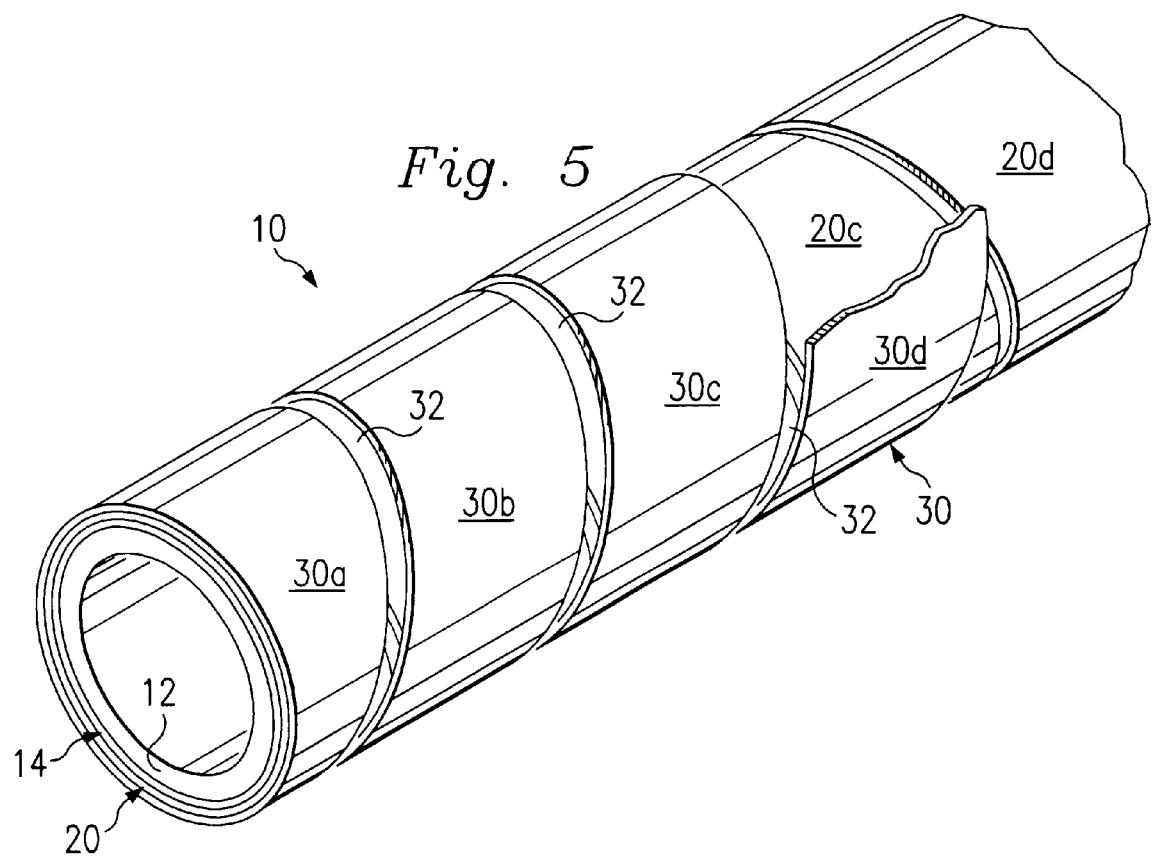

FLEXIBLE PIPE AND METHOD OF FABRICATING SAME USING OVERLAPPING LAYERS

BACKGROUND

This disclosure relates generally to a flexible pipe, and, more particularly, to a flexible pipe having overlapping layers.

It is well known to provide flexible pipes that consist of a inner tubular member over which is wrapped one or more layers of flexible material to improve the strength and performance characteristics of the pipe. However, many of these prior devices suffer from one or more problems. For example, gaps are often formed between the wrapped sections of one or more of the layers through which the inner tube member can extrude. A common method used to avoid this problem is to bond the layers-to the tube and to each other which prohibits independent movement of the layers in response to stresses on the pipe. Typically, these bonded pipes have a fairly short life when used in dynamic service because of the stresses between layers that tend to separate the pipe layers.

Therefore, what is needed is a flexible pipe formed by a plurality of wrapped layers which avoids the above problems.

DESCRIPTION OF THE DRAWINGS

FIGS. 3 and 4 are sectional views taken along the lines 3—3 and 4—4, respectively, of FIG. 1.

FIGS. 5 and 6 are partial isometric views of the complete pipe of the above embodiment.

DETAILED DESCRIPTION

Figure 1:
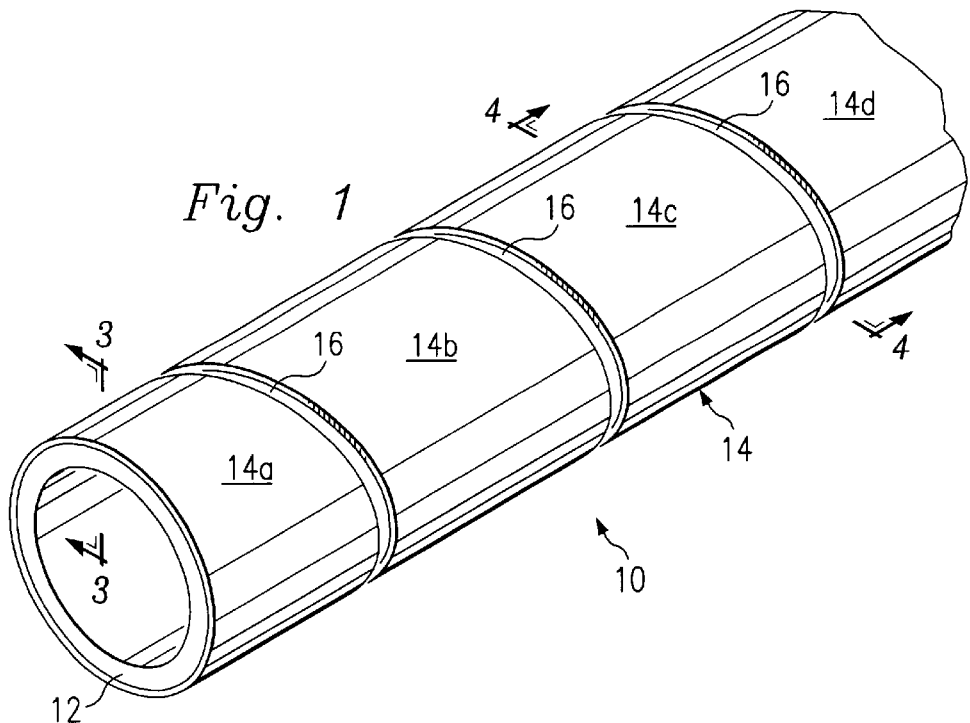
FIGS. 1 and 2 are partial isometric views of a portion of a flexible pipe according to an embodiment.
Figure 2:
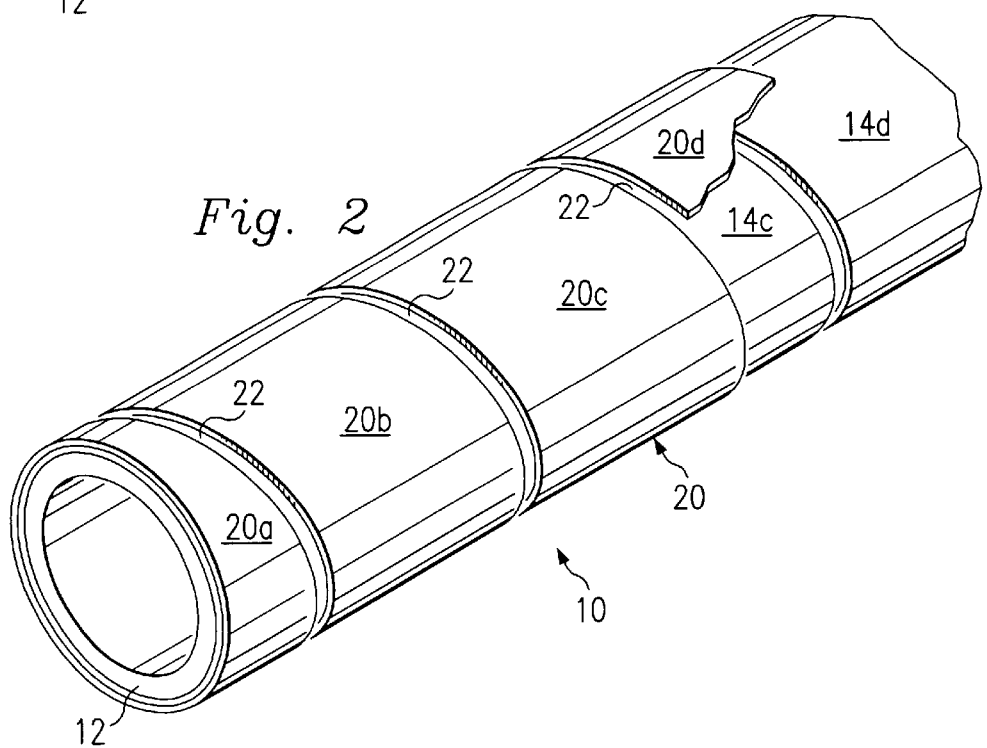
Figure 3:
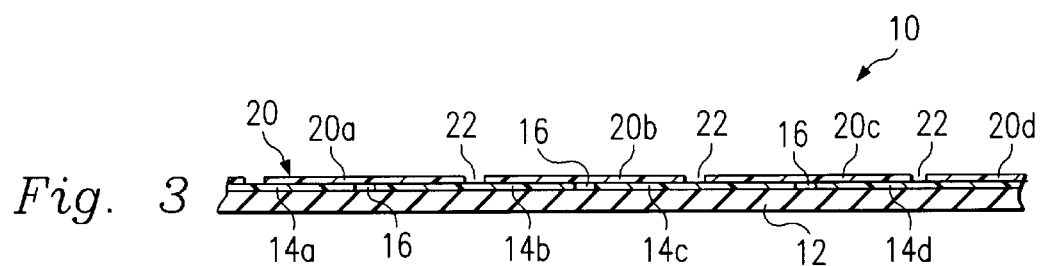

FIGS. 1 and 2 depict a portion of a flexible pipe shown, in general, by the reference numeral 10, according to an embodiment of the present invention. The pipe 10 includes an internal, pressure-containing, inner sheath, or barrier, in the form of a tube 12 having a layer 14 of a flexible material helically wound thereover in a helical manner. The layer 14 can be formed by a tensile element preferably in the form of a relatively wide steel strip having a rectangular cross section.

The layer 14 is wound at an angle that, for the purpose of example only, extends approximately 52° to the longitudinal axis of the tube 12. The helical winding of the layer 14 forms a plurality of sections 14a, 14b, 14c, and 14d axially spaced along the length of the tube 12, and the winding is such that relatively small gaps 16 extend between adjacent sections. As a non-limitative example each gap can be 5–10% of the width of the layer. Although the entire length of the tube 12 is not shown in FIGS. 1 and 2, it is understood that the layer 14 is wound for its entire length thus forming additional sections.

As shown in FIG. 2, a layer 20 of a flexible material, which can be identical to that of the layer 14, is wound over the layer 14 in a helical manner the same direction, and at substantially the same angle, as the layer 14. (In this context the angles can not be identical since the layers 12 and 14 are laid on the tube 12 at slightly different diameters.) The helical winding of the layer 20 forms a plurality of sections 20a, 20b, 20c, and 20d axially spaced along the length of the tube 12, and the winding is such that relatively small gaps 22 are formed between adjacent sections. It is also understood that the layer 20 is wound for the entire length of the tube 12.

The layer 20 is wound so that its sections 20a, 20b, 20c and 20d overlap the gaps 16 between the adjacent layers of the layer 14. Thus, the gaps 22 of the layer 20 are overlapped by the sections 14a, 14b, 14c and 14d of the layer 14.

As shown in FIG. 4 diametric opposite portions of the layer 14 are bent radially outwardly to form tabs 14t that extend in the gap 22 between two adjacent sections of the layer 20. Similarly, diametric opposite portions of the layer 20 are bent radially inwardly to form tabs 20t that extend in the gap 16 between two adjacent sections of the layer 14. The tabs 14t and 20t prevents any relative movement between the layers 14 and 20 which may otherwise occur, especially if the pipe 10 is subject to a great deal of flexure. This also allows each gap 16 to grow and shrink as the pipe 10 is bent.

As shown in FIG. 5, a layer 30 of a flexible material, which may be identical to that of the layer 14, is wound over the layer 20 in a helical manner at the same angle as, but in an opposite direction of the winding of the layers 14 and 20. The helical winding of the layer 30 forms a plurality of sections 30a, 30b, 30c, and 30d axially spaced along the length of the tube 12, and the winding is such that relatively small gaps 32 are formed between adjacent sections. It is also understood that the layer 30 is wound for the entire length of the tube 12.

Figure 6:
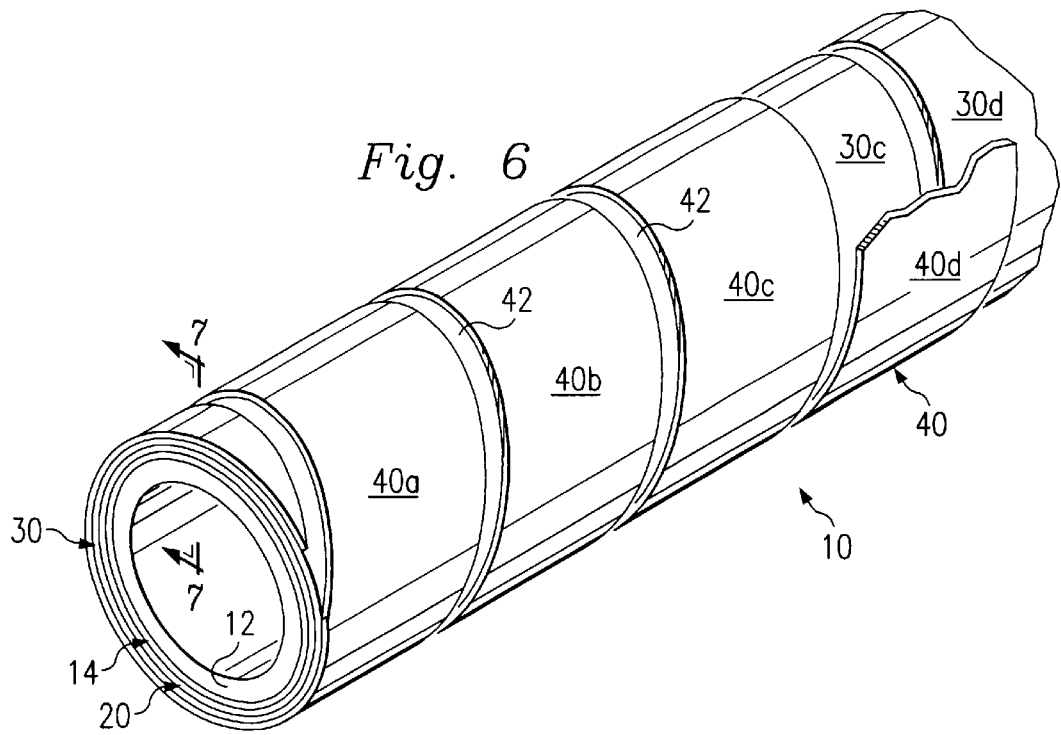
Figure 7:
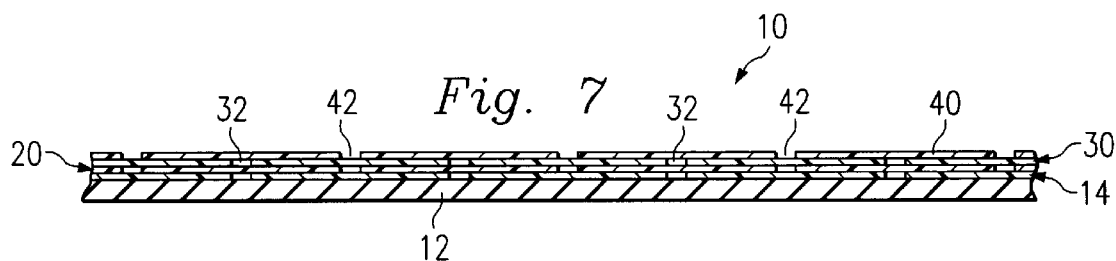
FIG. 7 is a sectional views taken along the line 7—7 of FIG. 6.

As shown in FIGS. 6 and 7, an optional layer 40 of a flexible material identical to that of the layer 14 can be wound over the layer 30 in a helical manner at the same angle, and in the same direction, as the layer 30 and therefore in an opposite direction to the layers 14 and 20. The helical winding of the layer 40 forms a plurality of sections 40a, 40b, 40c, and 40d axially spaced along the length of the tube 12, and the winding is such that relatively small gaps 42 extend between adjacent sections. It is also understood that the layer 40 is wound for the entire length of the tube 12.

The layer 40 can be wound so that its sections 40a, 40b, 40c, and 40d overlap the gaps 32 between the adjacent layers of the layer 30; and the gaps 42 of the layer 40 are overlapped by the sections 30a, 30b, 30c and 30d of the layer 30.

Although not shown in the drawing in the interest of clarity, it is understood that one or more tabs, identical to the tabs 14t of the previous embodiment can be provided on the layer 30 that extend radially outwardly into the gap 42 between adjacent sections of the layer 40. Also, one or more tabs, identical to the tabs 20t of the previous embodiment can be provided on the layer 40 that extend radially inwardly into the gap 32 between two adjacent sections of the layer 30. These tabs on the layers 30 and 40 function in the same manner as the tabs 14t and 20t.

When fluid is introduced into the tube 12, the internal fluid pressure forces the tube radially outwardly against the layers 14, 20, 30, and 40, causing tension to develop in the layers which creates a reaction load against the tube 12. Due to the overlapping relationship of the layers 14, 20, 30, and 40, the entire outside surface of the tube 12 is supported, and there are no gaps between the layers through which the tube can extrude. Moreover, the layers 30 and 40 supply a twisting moment in the opposite direction from layers 14 and 20, offsetting the moment applied by the layers 14 and 20 to the tube 12 as internal pressure is applied. Thus, the layers 30 and 40 tend to balance the longitudinal and circumferential components of load in the pipe 10. As a result, both the diameter and the length of the pipe 10 change very little with changes in internal pressure.

In each of the above embodiments, an optional protective layer may be applied over the outer layers to provide environmental protection for the above tensile elements.

Variations and Equivalents

Figure 8:
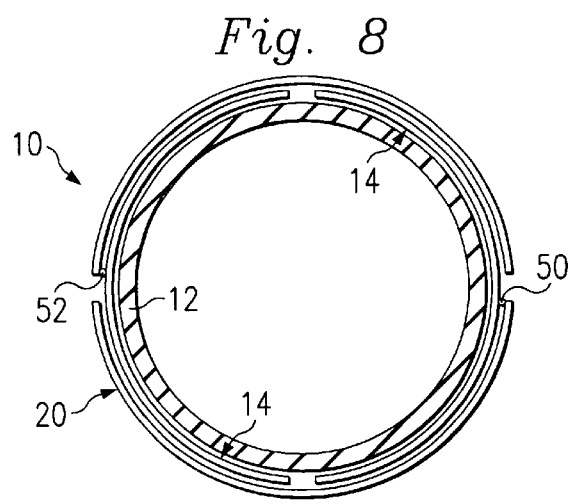
FIG. 8 is a view similar to that of FIG. 4, but depicting an alternate embodiment of the present invention.

It is understood that the tabs 14*t* and 20*t* (and corresponding tabs on the layers 30 and 40) can be eliminated and the outer surface of the layer 14 can be welded, or otherwise bonded, to the inner surface of the layer at diametrically opposite portions thereof, to form two weldments, or joints, 50 and 52 (FIG. 8). The weldments 50 and 52 are preferably located adjacent the gap 16 formed between adjacent sections of the layer 14 and prevent any relative longitudinal movement between the layers 14 and 20. Although not shown in the drawings, in the interest of clarity, it is understood that weldments can be provided between the layers 30 and 40 and/or between the layers 30 and 40 in a similar manner.

It is understood that the layer 40 can be eliminated and the size of the layer 30 can be approximately doubled when compared to the thickness of the layers 14 and 20. Also, the layers 14 and 20 can be replaced by a single layer that is wound on the tube 12 with an overlap. This integrates the function of the simple layers 14 and 20 into a single layer with somewhat similar structure. Further, the layers 30 and 40 can be replaced by a single layer that is wound on the adjacent inner layer 20 with an overlap. Moreover, one or more of the layers 14, 20, 30 and 40 can be formed by a plurality of relatively narrow strips disposed in a side-by-side relation; by a high strength tape with oriented polymer chains; by tapes reinforced with fibres, composites of strength-adding polymers, or strips of other metals; or by tapes containing metal reinforcements, including steel, aluminium, or copper alloys. Still further, the number, size, and specific composition of the layers, sections, and gaps disclosed above can vary within the scope of the invention. Also, the layers can be wound at angles different from that disclosed above, and each layer can be wound at a different angle than the other layer or layers in the same pipe. Moreover, the steel strip forming the layers is not limited to being rectangular in cross-section, but can take other shapes. Further, coatings can be provided on any or all of the layers 14, 20, 30, and 40.

Since other modifications, changes, and substitutions are intended in the foregoing disclosure, it is appropriate that the appended claims be construed broadly and in a manner consistent with the scope of the invention.

What is claimed is:

1. A flexible pipe, comprising:

a tubular member defining a longitudinal passage adapted to contain a fluid;

a first layer of flexible material helically wrapped around the outer surface of the tubular member in a manner to form gaps between adjacent wrapped sections of the layer;

a second layer of flexible material wrapped around the first layer and in the same direction as the direction of wrapping of the first layer, with the wrapped sections of the second layer overlapping the gaps of the first layer;

a third layer of flexible material wrapped around the second layer in a direction opposite to the direction of wrapping of the second layer, wherein the third layer is wrapped in a manner to form gaps between adjacent wrapped sections; and a fourth layer of flexible material wrapped around the third layer and in the same direction as the direction of wrapping of the third layer, with the wrapped sections of the fourth layer overlapping the gaps of the third layer.

2. The pipe of claim 1 wherein each layer extends from one end of the tube to its other end.

3. The pipe of claim 1 wherein at least one locating member is formed on at least one of the layers that extends into a gap in its adjacent layer to prevent relative movement between the layers.

4. The pipe of claim 3 further comprising at least one locating member formed on the adjacent layer that extends into a gap in the one layer.

5. The pipe of claim 4 wherein the locating members are tabs formed on the one layer and on the adjacent layer.

6. The pipe of claim 1 further comprising means for securing the first layer to the second layer to prevent relative movement therebetween.

7. The pipe of claim 6 wherein the means is a weldment.

8. A flexible pipe, comprising:

a tubular member defining a longitudinal passage adapted to contain a fluid;

a first layer of flexible material helically wrapped around the outer surface of the tubular member in a manner to form gaps between adjacent wrapped sections of the layer, a second layer of flexible material wrapped around the first layer and in the same direction as the direction of wrapping of the first layer;

a third layer of flexible material wrapped around the second layer in a direction opposite to the direction of wrapping of the second layer, a fourth layer of flexible material wrapped around the third layer and in the same direction as the direction of wrapping of the third layer, and a weldment for securing the fourth layer to the third layer to prevent relative movement therebetween.

9. A method of manufacturing a flexible pipe, comprising wrapping a first layer of flexible material around a tubular member in a manner to form gaps between adjacent wrapped sections of the layer;

wrapping a second layer of flexible material around the first layer and in the same direction as the direction of wrapping of the first layer, with the wrapped sections of the second layer overlapping the gaps of the first layer;

wrapping a third layer of flexible material wrapped around the second layer in a direction opposite to the direction of wrapping of the second layer, wherein the third layer is wrapped in a manner to form gaps between adjacent wrapped sections, and wrapping a fourth layer of flexible material around the outer surface of the third layer and in the same direction as the direction of wrapping of the third layer, with the wrapped sections of the fourth layer overlapping the gaps of the third layer.

10. The method of claim 9 wherein each layer is wrapped from one end of the tube to its other end.

11. The method of claim 9 further comprising forming at least one locating member on at least one of the layers that extends into a gap in its adjacent layer to prevent relative movement between the layers.

12. The pipe of claim 10 further comprising forming at least one locating member on the adjacent layer that extends into a gap in the one layer.

13. The method of claim 9 further comprising wrapping a fourth layer of flexible material around the outer surface of the third layer and in the same direction as the direction of wrapping of the third layer, with the wrapped sections of the fourth layer overlapping the gaps of the third layer, and securing the fourth layer to the third layer to prevent relative movement therebetween.

14. The method of claim 13 wherein the step of securing comprises welding the fourth layer to the third layer.

15. A flexible pipe, comprising:
   a tubular member defining a longitudinal passage adapted to contain a fluid;
   a first layer of flexible material wrapped around the outer surface of the tubular member in a manner to form gaps between adjacent wrapped sections of the layer;
   a second layer of flexible material wrapped around the first layer and in the same direction as the direction of wrapping of the first layer; and
   at least one locating member formed on at least one of the layers that extends into a gap in the other layer to prevent relative movement between the layers.

16. The pipe of claim 15 wherein at least one locating member is formed on each layer.

17. The pipe of claim 15 wherein the locating members is a tab formed by bending the at least one layer.

18. The pipe of claim 15 wherein the first layer is helically wrapped around the tubular member, and wherein the second layer is helically wrapped around the first layer.

19. The pipe of claim 15 further comprising a third layer of flexible material wrapped around the second layer in a direction opposite to the direction of wrapping of the second layer.

20. The pipe of claim 19 further comprising a fourth layer of flexible material wrapped around the third layer and in the same direction as the direction of wrapping of the third layer.

21. A method of manufacturing a flexible pipe, comprising:
   wrapping a first layer of flexible material around a tubular member in a manner to form gaps between adjacent wrapped sections of the layer;
   wrapping a second layer of flexible material around the first layer and in the same direction as the direction of wrapping of the first layer; and
   forming at least one locating member on at least one of the layers that extends into a gap in the other layer to prevent relative movement between the layers.

22. The method of claim 21 wherein at least one locating member is formed on each layer.

23. The method of claim 21 wherein the step of forming comprises bending the at least one layer.

24. The pipe of claim 21 wherein the first layer is helically wrapped around the tubular member, and wherein the second layer is helically wrapped around the first layer.

25. The method of claim 21 further comprising wrapping a third layer of flexible material around the second layer in a direction opposite to the direction of wrapping of the second layer.

26. The method of claim 25 further comprising wrapping a fourth layer of flexible material around the third layer and in the same direction as the direction of wrapping of the third layer.

* * * * *